United States Patent Office 3,337,560
Patented Aug. 22, 1967

3,337,560
SUBSTITUTED N-PROPARGYLOXYPHTHALIMIDE
John H. Biel, Milwaukee, Wis., and Ernst R. Jaeger, Munich, Germany, assignors to Aldrich Chemical Co., Inc., Milwaukee, Wis., a corporation of Wisconsin
No Drawing. Filed Jan. 3, 1964, Ser. No. 335,654
7 Claims. (Cl. 260—294)

This invention relates to novel substituted phthalimides of the following general formula:

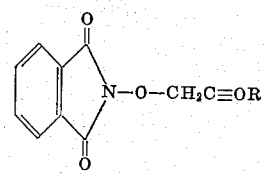

where R is selected from the group consisting of lower alkyl, such as methyl, ethyl, propyl, isopropyl, butyl, hexyl and the like; lower alkenyl, such as vinyl, allyl, isopropenyl, butenyl, butadienyl and the like; aralkyl, particularly phenyl-lower alkyl such as benzyl and phenethyl, and amino-lower alkyl in which the amino group may be either a substituted or unsubstituted amino group. These new compounds are valuable intermediates in the preparation of various O-substituted hydroxylamine derivatives. Such derivatives are obtained by the acid or alkaline cleavage of the protective phthaloyl group. This cleavage is accomplished quickly with good yields of the various hydroxylamine derivatives.

It is an object of the instant invention to provide novel compounds which are reactive intermediates for the production of O-substituted hydroxylamines. Another object is to provide compounds which are easily cleaved under acid or alkaline conditions to give O-substituted hydroxylamines. Further objects and a fuller understanding of the invention may be had by referring to the following description and claims.

The preparation of the various compounds of this invention is accomplished by first reacting N-hydroxyphthalimide in the form of a reactive metal salt with propargyl halide in the presence of an inert solvent to produce N-propargyloxyphthalimide. The reaction proceeds according to the following general formula:

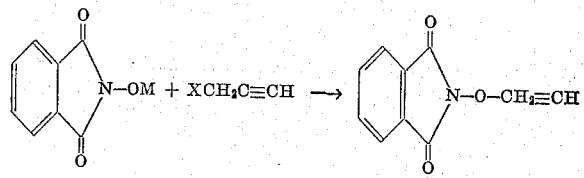

where M is lithium, sodium or potassium and X is a halogen atom. The other compounds within the scope of the present invention are then made by reacting the highly reactive alkali metal salt of the N-propargyloxyphthalimide with an appropriate reactive organic halide in accordance with the following formula:

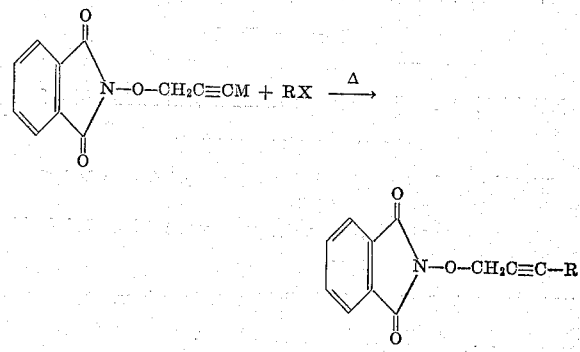

where M is lithium, potassium or sodium and RX is a reactive organic halide such as a lower alkyl-, lower alkenyl-, phenyl-lower alkyl or amino-lower alkylhalide. The alkali metal salt of the N-propargyloxyphthalimide is produced with such reagents as lithium amide, butyl lithium, sodium amide, sodium hydride, potassium amide or potassium carbonate.

These novel substituted phthalimides may then be reacted further via reduction or hydroxylation to yield the corresponding alkenes, alkanes, alkanones, alkanols or alkandiols as follows:

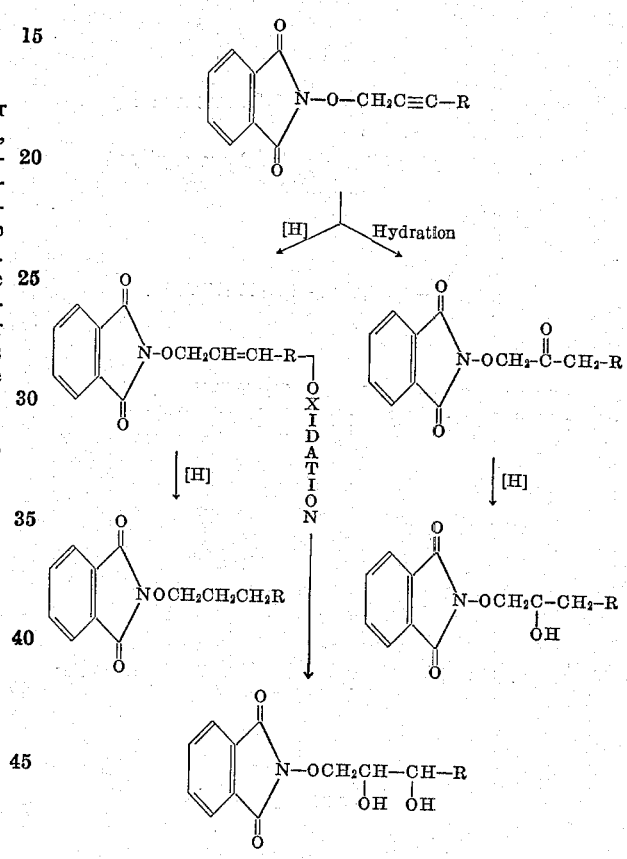

wherein R has the significance previously defined.

Alkaline or acid cleavage of the protective phthaloyl group will produce the desired O-substituted hydroxylamine. Thus in the case of N-propargyloxyphthalimide, cleavage yields propargyloxyamine as follows:

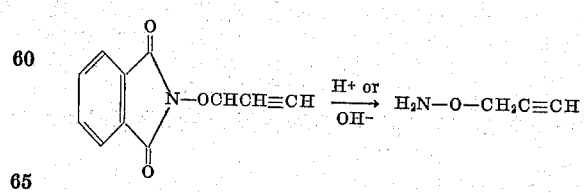

This cleavage, as noted above, proceeds quickly and gives good yields of the amine.

The O-substituted hydroxylamine products from the novel intermediates of this invention are useful in isolating penicillin from fermentation broths.

The invention will now be illustrated by, but is not intended to be limited to, the following examples:

*Example 1.—N-propargyloxyphthalimide*

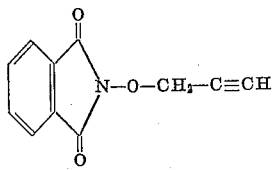

A mixture containing 270 g. N-hydroxyphthalimide, 110 g. anhydrous potassium carbonate and 720 g. propargyl-bromide and 150 cc. dimethylformamide was refluxed with stirring for 24 hours. The crystallized product was separated by filtration and washed with ethanol. The precipitate was then ground with water in a mortar to dissolve inorganic salts. After filtration the filter cake was washed sparingly with ethanol and then ether. Yield: 214 g. (64%); M.P. 146–149°.

The product when recrystallized from ethanol gave a melting point of 149–150°.

*Example 2.—N-(5-diethylamino-2-pentynyloxy) phthalimide*

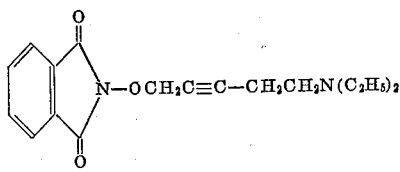

To 12 g. (0.3 mole) of sodamide in 300 cc. of xylene was added 60.3 g. (0.3 mole) of N-propargyloxyphthalimide prepared as in Example 1. The mixture was heated at reflux for one hour and 68 g. (0.5 mole) of 2-diethylaminoethyl chloride was added. The mixture was refluxed for 20 hours. Two hundred cc. of water was added to dissolve the solids and the layers separated. The xylene layer was extracted three times with dilute hydrochloric acid. The acid solution was washed three times with ether and then neutralized with dilute alkali. A solid product precipitated which was isolated by filtration.

*Example 3.—N-[3-(N'-methylpiperidyl)-propargyloxy]-phthalimide*

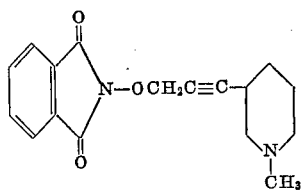

To 12 g. (0.3 mole) of sodamide in 300 cc. of xylene was added 60.3 g. (0.5 mole) of N-propargyloxyphthalimide. The mixture was refluxed for one hour and 70 g. (0.5 mole) of N-methyl-3-chloropiperidine added. The mixture was refluxed for 20 hours. Two hundred cc. of water was added to dissolve the solids and the layers separated. The xylene layer was extracted three times with dilute hydrochloric acid, the aqueous acid extracts neutralized with potassium hydroxide and the solid product isolated by filtration and washed with water.

*Example 4.—N-(4-phenyl-2-butynyloxy)-phthalimide*

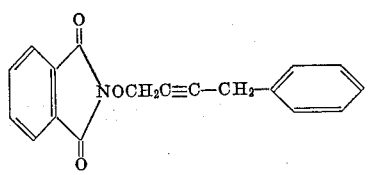

To 12 g. (0.3 mole) of sodamide in 300 cc. of xylene was added 60.3 g. (0.3 mole) of N-propargyloxyphthalimide. The mixture was refluxed for one hour and 63.3 g. (0.5 mole) of benzyl chloride added. The mixture was refluxed for 10 hours. Two hundred cc. of water were added to dissolve the solids and the layers separated. The xylene layer was dried over potassium carbonate and the xylene removed by distillation in vacuo. A solid product precipitated out during the distillation which was separated by filtration.

*Example 5.—N-2-octynyloxyphthalimide*

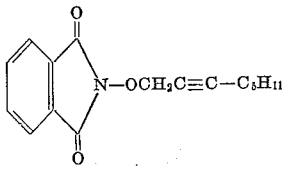

In a manner identical to the procedure described in Example 4, 0.3 mole of the sodium salt of N-propargyloxyphthalimide was reacted with 0.5 mole of 1-bromopentane and the product isolated in the usual manner (Example 4).

*Example 6.—N-(2-hexyn-5-enyloxy)phthalimide*

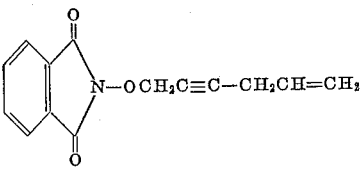

In a manner identical to the procedure described in Example 4, 0.3 mole of the sodium salt of N-propargyloxyphthalimide was reacted with 0.5 mole of allyl bromide and the product isolated in the usual manner (Example 4).

Various changes and modifications of the invention can be made and, to the extent that such variations incorporate the spirit of this invention, they are intended to be included within the scope of the appended claims.

What is claimed is:

1. Substituted phthalimides of the formula

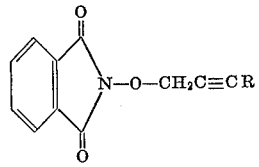

wherein R is selected from the group consisting of hydrogen, lower alkyl, lower alkenyl, phenyl-lower alkyl, amino lower alkyl, lower alkyl amino, lower akyl, and piperidyl.

2. N-propargyloxyphthalimide
3. N-(5-diethylamino-2-pentynyloxy)-phthalimide.
4. N - [3-(1-methyl-3-piperidyl)-propargyloxy]-phthalimide.
5. N-(4-phenyl-2-butynyloxy)-phthalimide.
6. N-2-octynyloxyphthalimide.
7. N-(2-hexyn-5-enyloxy)-phthalimide.

References Cited

UNITED STATES PATENTS 3,036,088   5/1962   Harris _____ 260—326

OTHER REFERENCES

McKay et al.: Can. J. of Chem., vol. 38, pages 343, 349 and 350, January, April 1960.

Fieser et al.: Adv. Org. Chem., page 220, Reinhold Publ. New York (1961).

WALTER A. MODANCE, *Primary Examiner.*

A. D. SPEVACK, *Assistant Examiner.*